H. R. HAWKINS.
Straw Cutter.
No. 30,677.
Patented Nov. 20, 1860.
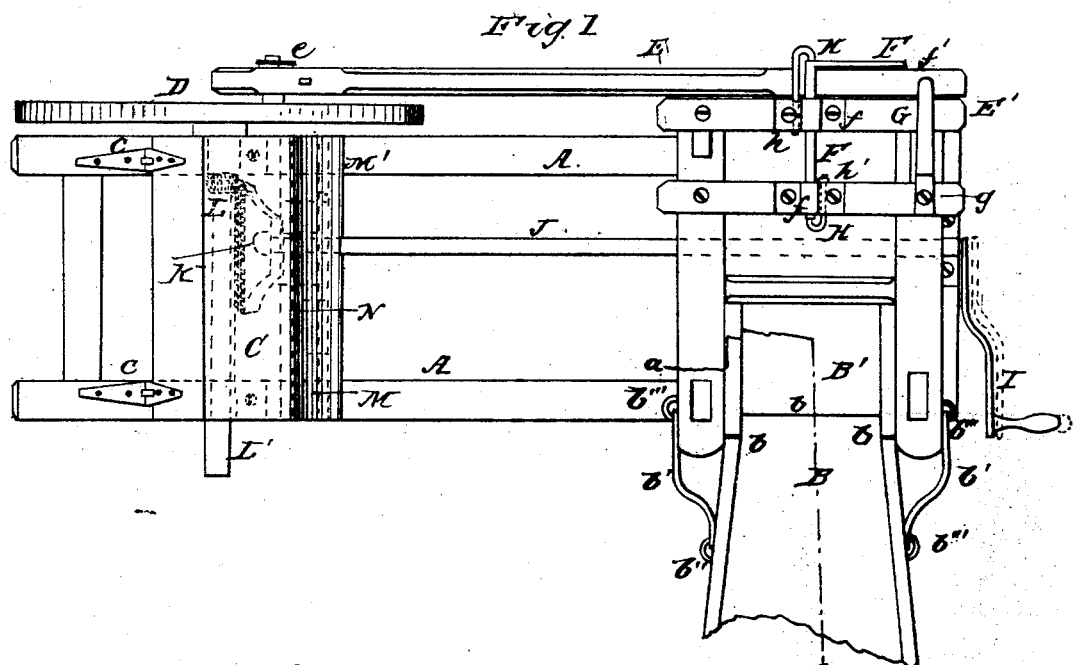
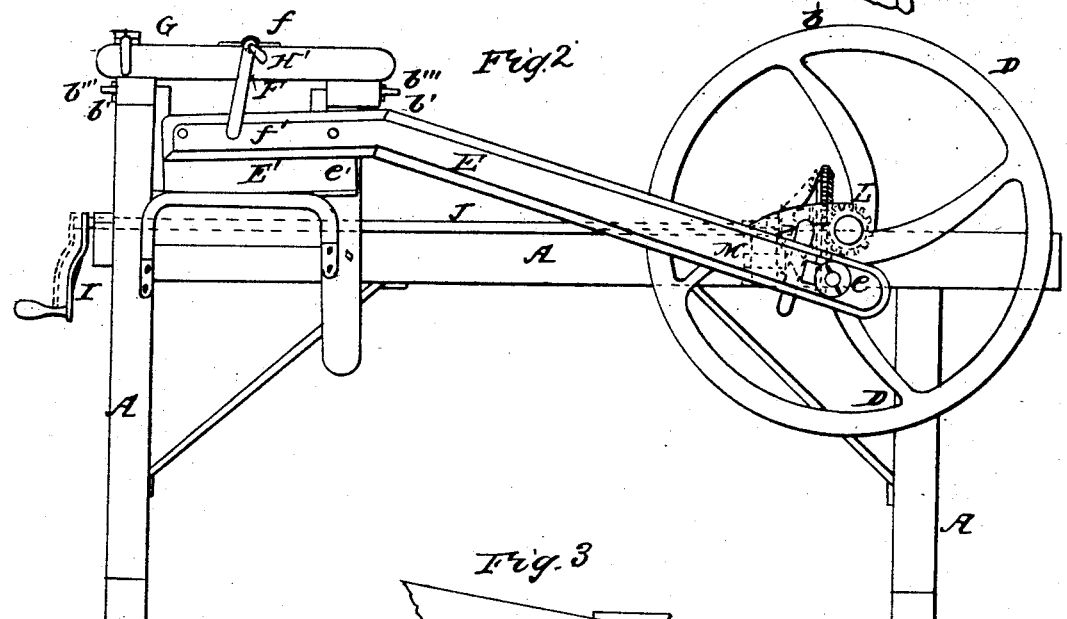
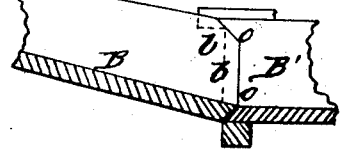

UNITED STATES PATENT OFFICE.

HORACE R. HAWKINS, OF AKRON, OHIO.

HAY AND STRAW CUTTER.

Specification of Letters Patent No. 30,677, dated November 20, 1860.

*To all whom it may concern:*

Be it known that I, HORACE R. HAWKINS, of Akron, in the county of Summit and State of Ohio, have invented certain new and useful Improvements in Hay or Straw Cutters; and I do hereby declare that the following is a full, clear, and exact description of the same, reference being had to the accompanying drawings, forming a part of this specification, in which—

Figure 1, represents a plan or top view of my machine, in position for operation by hand, showing in dotted lines the cog wheel unconnected from the gearing of the balance wheel, and in position to be operated by horse or other power. Fig. 2, represents a side elevation in the positions above described. Fig. 3 represents a detached sectional view at *a b*, showing the division and manner of attaching the feed box.

The nature of my improvements consist in using the hooked bolts in connection with right-angled shaft, for the purpose of making the knife adjustable.

In the accompanying drawings A, represents the frame of the machine. The feed box is made in two parts, B, B′, the part B, of which, fits into the recess or groove *b*, as seen in Fig. 3, and is held in position by hooks *b′*, *b′*, which are themselves fastened to the removable box B, at *b″*, *b″*, and hooked to the frame of the machine at *b‴*, *b‴*, as shown.

C, represents a lid hinged at *c*, covering and protecting the cog or gearing wheels as fully shown.

D, represents the balance wheel.

The knife lever E, to which the knife E′, is attached, as shown, works on a pin *e*, rigidly secured to the balance wheel. F, is a right-angled swing-shaft, set and held, as at *f*, *f*, or nearly over the center of the mouth of the feed box, and pivoted at *f′* to the knife lever E, which exerts, what I term, the "knuckle lever pressure," thereby concentrating the power over the mouth of the feed box, where it is the most required.

G, is a spring secured at *g*, which assists in reversing the movements of the knife lever E.

H, H′, are hooked bolts, which serve to keep the edge *e′*, of the knife, up close against the edge of the feed box, thereby avoiding the trouble so common in hay or straw cutters of this description, of the knives "sagging" or wearing away from the edge of the feed box, and tearing rather than cutting the hay or straw to be cut—which, as is well known, requires much waste of power and is very injurious to the machine. These bolts H, and H′, pass through a hole in the frame made for their reception and are screw threaded at their ends *h*, *h′*,—the other ends are hooked and press against the ends, as shown, of the right angled swing shaft F. When the knife, as it will by use, becomes separated or "sags" from the edge of the feed box, all that is necessary to be done is, to unscrew the nut at *h′* on the bolt H′, and screw up the nut *h*, on the bolt H. When the right-angled lever will be screwed inward, and through its pressure on the knife lever, the knife will be made to press more closely against the rim of the feed box, and consequently cut more perfectly the hay or straw submitted to its action.

I, is the hand crank or lever, rigidly attached to the shaft J, to the other end of which is secured a cog wheel K, which works on a smaller cog wheel L, on the shaft L′, of the balance wheel D, and by the continued operation of which, motion is given to the knife.

The operation is as follows: When the machine is to be worked by hand, the operator will take hold of the hand lever I, and by turning it, motion will be communicated through the shaft J, cog wheels K, and L, shaft L′, balance wheel D, and knife lever E, respectively, as before explained, to the knife, which in its turn will, through the agency of right-angled lever F, and spring G cut clearly and with greater facility than any other straw cutter heretofore known by me.

When it is desired to be operated by means of horse or other power, the wedges M, M′, are taken out, and the bar N, slid back in the spaces left by the wedges M, M′, which will carry the cog wheel K, back into the position shown in red, when a driving wheel may be secured to the projecting end of shaft L′, and a belt communicating power thereto slipped on, and the operation goes on as before explained.

What I claim and desire to secure by Letters Patent, is—

The use of the hook bolts H, H', in connection with the right angled shaft for making the knife adjustable.

In witness whereof I have hereunto subscribed my name.

HORACE R. HAWKINS.

In presence of—
J. W. STEPHENS,
H. W. HOWE.